United States Patent [19]
Brown

[11] Patent Number: 5,171,035
[45] Date of Patent: Dec. 15, 1992

[54] ARTICULATED VEHICLE WITH STEERING LINKAGE

[75] Inventor: David P. Brown, Northallerton, Great Britain

[73] Assignee: Multidrive Limited, Stockton-On-Tees, Great Britain

[21] Appl. No.: 655,408

[22] PCT Filed: Jun. 15, 1989

[86] PCT No.: PCT/GB89/00667
§ 371 Date: Feb. 25, 1991
§ 102(e) Date: Feb. 25, 1991

[87] PCT Pub. No.: WO90/00487
PCT Pub. Date: Jan. 25, 1990

[30] Foreign Application Priority Data

Jul. 6, 1988 [GB] United Kingdom ............ 8816047

[51] Int. Cl.⁵ .................. B62D 13/02; B62D 53/00
[52] U.S. Cl. ............................. 280/442; 280/426
[58] Field of Search ............... 280/426, 442, 404

[56] References Cited

U.S. PATENT DOCUMENTS 4,735,432 4/1988 Brown ........................ 280/426

FOREIGN PATENT DOCUMENTS

| | | |
|---|---|---|
| 0112712 | 7/1984 | European Pat. Off. |
| 2518950 | 7/1983 | France |
| 352241 | 3/1961 | Switzerland |
| 363244 | 8/1962 | Switzerland ........ 280/442 |
| 388111 | 5/1965 | Switzerland |
| 86/01479 | 3/1986 | World Int. Prop. O. |
| 8910866 | 11/1989 | World Int. Prop. O. ........ 280/442 |

*Primary Examiner*—Mitchell J. Hill
*Attorney, Agent, or Firm*—Jacobson, Price, Holman & Stern

[57] ABSTRACT

An articulated vehicle with steering linkage having a main chassis (2) pivotally connected and supported by a front sub-chassis (1) for pivotal movement about a vertical axis (27) and pivotally connected to a rear sub-chassis (6) about a vertical axis (30), the front sub-chassis having a median plane (1') and the rear sub-chassis having a median plane (6') a linkage member (71) mounted on the rear sub-chassis for movement along the median plane thereof (6), and a linkage member (72) mounted on the front sub-chassis for movement along the front median plane (1'), the linkage members being connected together by a pivot member (73) for relative pivotal movement about a vertical pivot axis (61) lying substantially at the intersection of the median planes of the front and rear sub-chassis during turning of the vehicle. A control link (82) is pivotally connected on the median plane (2') of the main chassis (2) and also pivotally connected to the linkage member (71) so that during turning the ratio of the angle ($\alpha$) between the median plane (1') of the front sub-chassis (1) and the median plane (2') of the main chassis (2) to the angle ($\beta$) between the median plane (6') of the rear sub-chassis (6) and the median plane (2') of the main chassis is maintained substantially constant by controlling the motion of the first linkage member during turning.

9 Claims, 3 Drawing Sheets

ARTICULATED VEHICLE WITH STEERING LINKAGE

This invention relates to an articulated vehicle having a front sub-chassis and a rear sub-chassis, a main chassis supported by each sub-chassis for pivoting about a vertical axis, and linkage means for inter-relating the pivoting of the two sub-chassis, during turning of the vehicle, so that the angle between the median plane of one sub-chassis and the median plane of the main chassis is a function of the angle between the median plane of the other sub-chassis and the median plane of the main chassis.

Such a vehicle is disclosed in European patent application No. 83307741.5 Publication No. EP-B-0 112 712, in which the angles are maintained equal and opposite to each other by linkage means comprising crossed tension rods interconnecting the two sub-chassis and extending under the main chassis. The tension rods obstruct the underside of the main chassis and require lateral extension of the sub-chassis. An alternative linkage means comprises a sliding bearing which is carried by a transverse guide member on the main chassis and which is separately pivoted to two telescopic members extending along the median planes of the two sub-chassis. The transverse guide member obstructs the underside of the main chassis and is inconvenient to construct with sufficient strength. In both cases the ratio between the angles is fixed at unity. U.S. Pat. No. 4,735,432, corresponding to Pct/GB 85/00395, publication no. WO-A-86 01479, discloses a similar vehicle, in which the linkage means comprises a first linkage member mounted on the one sub-chassis and a second linkage member mounted on the other sub-chassis, the members being connected together by a pivot having a vertical pivot axis, the mounting of the members being such that the pivot axis is constrained to lie substantially at the intersection of the median planes of the two sub-chassis during turning. One member is fixed to the front sub-chassis and the other is movable along the median plane of the rear sub-chassis, so that the rear sub-chassis pivots through a smaller angle than the front sub-chassis during turning. In this arrangement the locus of the pivot axis is an arc of a circle centered on the pivot axis of the front sub-chassis. Thus the ratio between the angle of the front sub-chassis and the angle of the rear sub-chassis increases as the angles increase. This is disadvantageous, since ideally the ratio should be constant.

BRIEF SUMMARY OF THE INVENTION

A linkage means which enables the ratio of the angles to be controlled, preferably to be maintained substantially constant, whether or not the ratio is equal to unity.

According to the present invention, both of the members are movable along the respective median planes of the two sub-chassis, and control means act on the first linkage member so as to control the ratio between the angles by controlling the motion of the first linkage member during turning.

The control means preferably acts on a part of the first linkage member remote from the pivot axis, since the range of movement decreases with increasing distance from the pivot axis.

The control means preferably comprises mechanical guide means mounted on the main chassis. In one possible embodiment the guide means may comprise a transverse guide fixed on the main chassis and guiding a part of the first linkage member. The guide may be accurately shaped to ensure a constant ratio between the angles. However, in an embodiment preferred for simplicity of construction and adaptability of configuration, the guide means may comprise a rigid link having one end pivoted about a substantially vertical axis to the main chassis and the other end connected, directly or indirectly, to the first linkage member. When the vehicle turns, the other end of the rigid link will follow an arcuate path. By suitably selecting the position of the one end and the length of the rigid link, the motion of the first linkage member can be controlled so that the ratio between the angles is kept approximately constant. The one end is preferably pivoted at a point lying within the length of the first linkage member when the median planes are co-planar.

The second linkage member may be mounted on the other sub-chassis by a frame having a narrower end pivoted to the second linkage member about a horizontal axis and a wider end connected to the other sub-chassis by horizontally spaced links whose ends are pivoted about horizontal axes. The links are preferably connected to a further frame, which is pivotable together with the other sub-chassis about the pivot axis of the other sub-chassis and is also pivotable together with the main chassis about a horizontal axis.

BRIEF DESCRIPTION OF THE DRAWINGS

The invention will now be described further, by way of example, with reference to the accompanying drawings, wherein.

DETAILED DESCRIPTION

Figure 1:
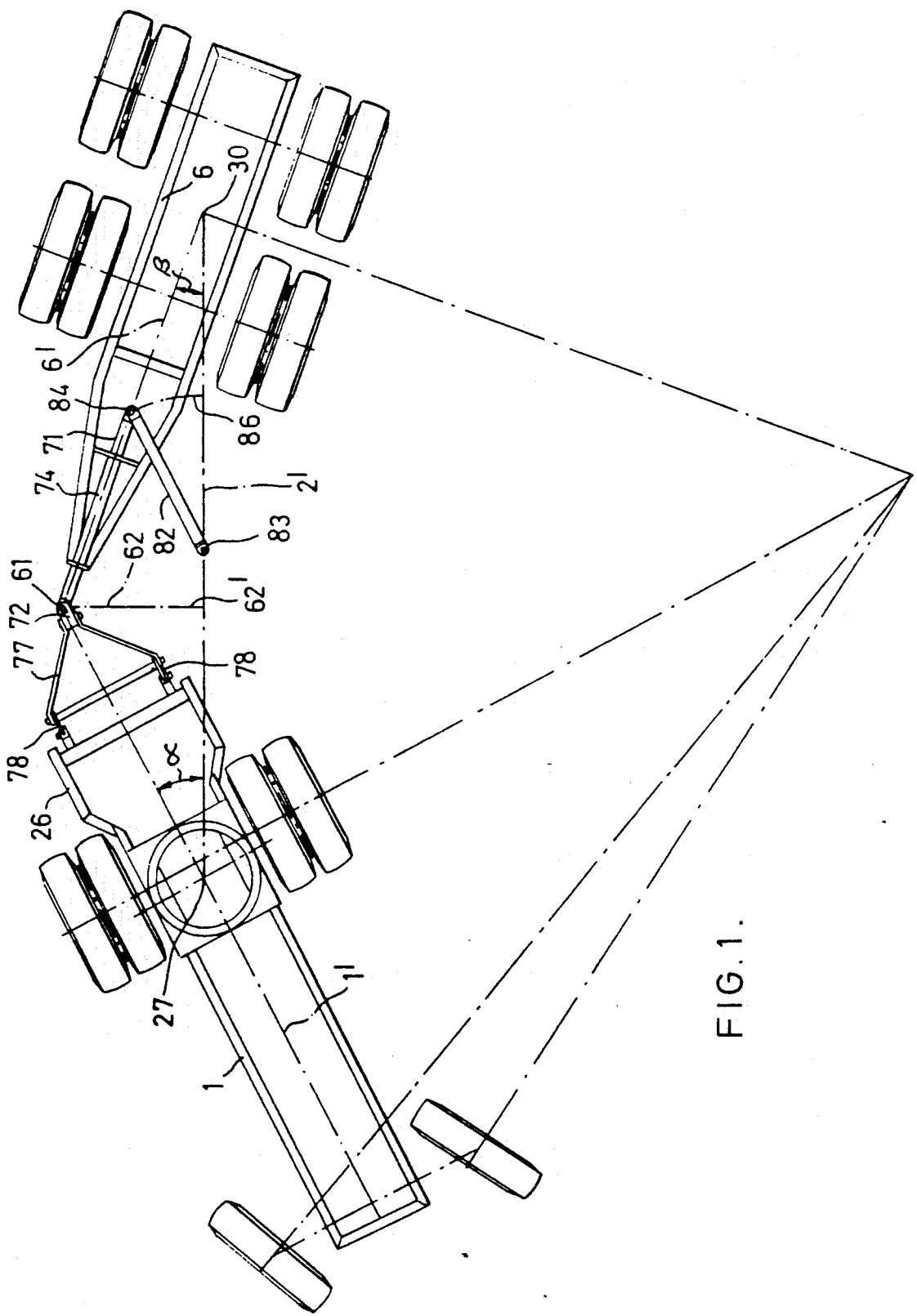
FIG. 1 is a schematic plan view of the steering arrangement of an articulated vehicle in accordance with the invention.

The vehicles illustrated are of the type described in WO-A-86 01479, having a main chassis 2 pivotally supported by front and rear sub-chassis 1,6, one of which carries the engine. Constant velocity power is communicated between the sub-chassis 1,6 by an intermediate shaft 20 (FIG. 4) connected to a front shaft (not shown) and a rear shaft 21 extending along the respective median planes 1',6' of the respective sub-chassis 1,6. During turning of the vehicle, the median planes 1',6' intersect at a point 61 nearer to the pivot axis 27 of the front sub-chassis 1 than to the pivot axis 30 of the rear sub-chassis 6. The universal joints of the intermediate shaft 20 are equidistant from the intersection point 61. The angle $\alpha$ between the median plane 1' of the front sub-chassis 1 and the median plane 2' of the main chassis is thus larger than the angle $\beta$ between the median plane 6' of the rear sub-chassis and the plane 2'. Ideally the ratio $\alpha/\beta$ should remain constant corresponding ideal locus 62 of the intersection point 61 is shown in broken line in FIG. 1.

Figure 3:
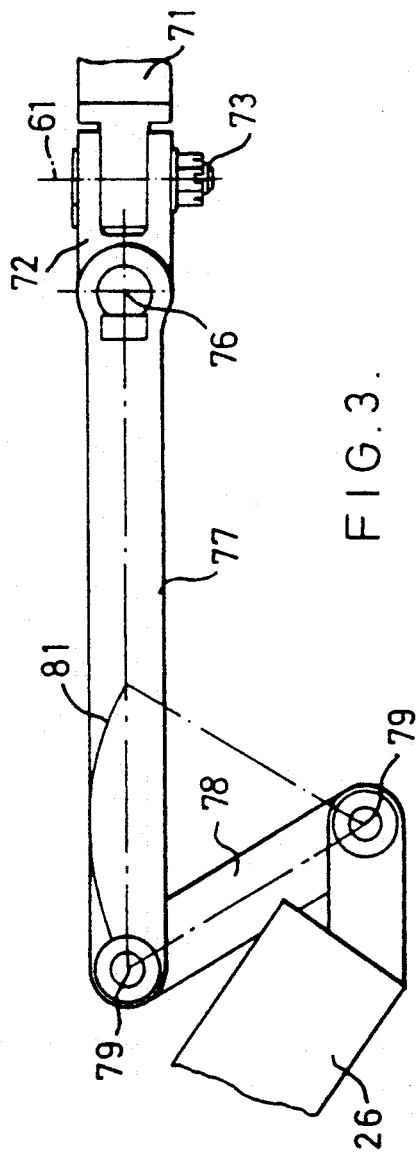
FIG. 3 is an enlarged detail of FIG. 2.
Figure 2:
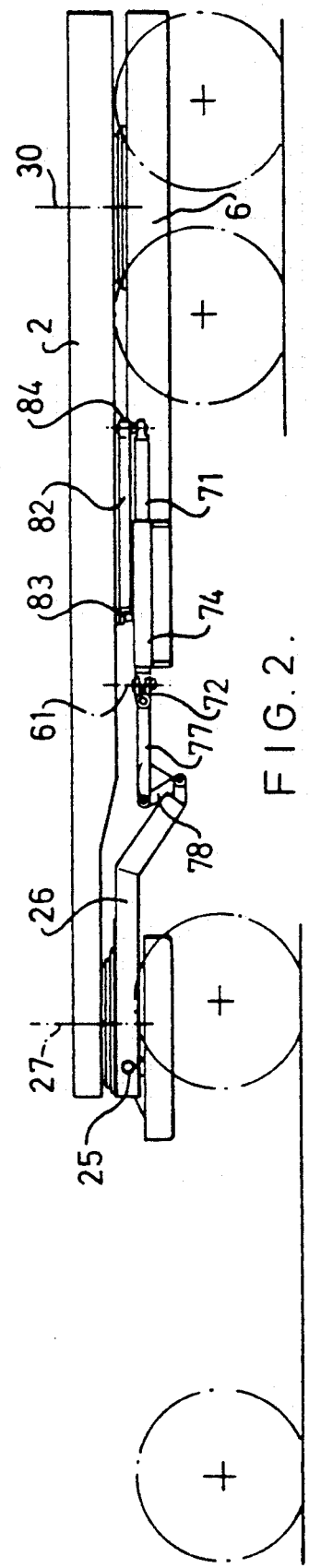
FIG. 2 is a schematic side view of the steering arrangement.

The linkage illustrated in FIGS. 1 to 3 is designed to achieve a locus 62' approximating the ideal locus 62 and comprises a first, elongate linkage member 71 mounted on the rear sub-chassis 6 and a second linkage member 72 mounted on the front sub-chassis 1, the members 71,72 being connected together by a pivot 73 having a vertical axis coinciding with the intersection point 61.

The first linkage member 71 extends along the median plane 6' of the rear sub-chassis 6 and is longitudinally guided by a tubular guideway 74 fixed to the sub-chassis 6. The second linkage member 72 is pivoted about a horizontal axis 76 to the narrower end of a generally triangular frame 77 whose wider end is connected by horizontally spaced links 78 (whose ends are pivoted about horizontal axes 79) to a further frame 26 pivoting with the front sub-chassis 1 about the axis 27 and pivoting with the main chassis 2 about a horizontal axis 25. The links 78 and the horizontal pivot axes 76,79 allow the member 72 to move along the median plane 1' of the front sub-chassis 1; the maximum extent of movement of the links 78 during turning is indicated by the arc 81 in FIG. 3.

The motion of the first linkage member 71 during turning is controlled by a rigid connecting bar 82 whose front end is pivoted about a vertical axis 83 to the underside of the main chassis 2 and whose rear end is pivoted to the rear end of the member 71 about a vertical axis 84. Accordingly the rear end of the member 71 follows an arc 86 centered on the axis 83 during turning. The position of the axis 83 and the length of the bar 82 are selected so that the arc 86 representing the locus of the axis 84 corresponds to the locus 62' of the axis 61 which most closely approximates to the ideal locus 62, i.e. so that the ratio $\alpha/\beta$ is approximately constant. As shown when the median planes 1',2',6' are co-planar (FIG. 2) the axis 83 preferably lies between the point 61 and a point half-way along the member 71.

The swinging bar 82 could be replaced by a curved guide fixed to the underside of the main chassis 2 and cooperating with a sliding element located on the rear end of the linkage member 71. The guide could then be accurately shaped to achieve the ideal locus 62.

Figure 4:
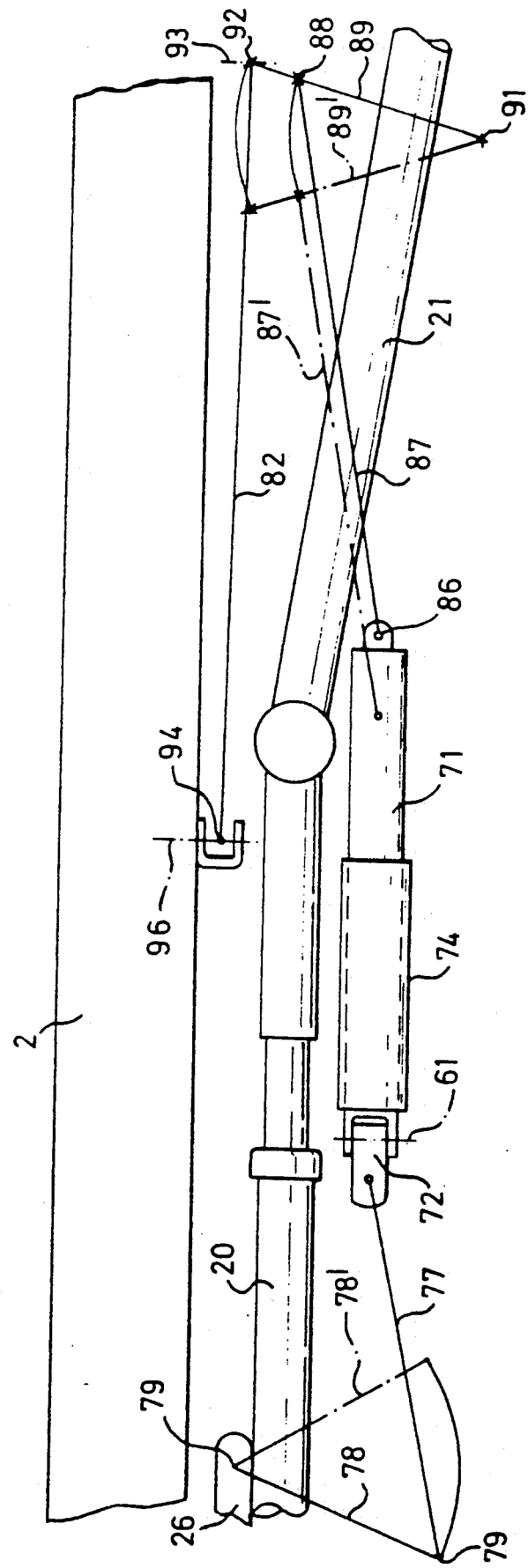
FIG. 4 is a schematic side view of part of another vehicle in accordance with the invention.

FIG. 4 shows a modification of the linkage in a situation in which the shaft 20 has to extend above part of the linkage. In this case the links 78 hang from the frame 26 so that the frame 77 is slung below the shaft 20. The rear end of the linkage member 71 is pivoted about a horizontal axis 86 to the front end of an open frame 87 through which the rear shaft 21 descends from the intermediate shaft 20. The rear end of the frame 87 is pivoted about a horizontal axis 88 to an intermediate point of an upstanding frame 89 whose lower end is pivoted to the rear sub-chassis about a horizontal axis 91 and whose upper end is pivoted about a horizontal axis 92 and vertical axis 93 to the rear end of the swinging bar 82 whose front end is pivoted to the main chassis 2 about a horizontal axis 94 and a vertical axis 96. The positions of the links 78, the frame 87, and the frame 89 during maximum turning of the vehicle are indicated in chain-dotted line at 78',87', and 89' respectively.

Various modifications may be made within the scope of the invention. For instance, it is possible to omit the shafts driving the wheels of the rear sub-chassis 6 and to drive only the non-steering wheels of the front sub-chassis 1. Instead of being mounted on the pivoted frame 77, the second linkage member 72 could be made elongate (like the first linkage member 71) and arranged slidably in a tubular guideway (like the guideway 74) extending along the median plane 1' of the front sub-chassis.

I claim:

1. An articulated vehicle comprising:
a front sub-chassis having a front median plane;
a rear sub-chassis having a rear median plane;
a main-chassis having a main median plane and supported by said front and rear sub-chassis for pivotal movement with respect thereto;
front pivot means for connecting said front sub-chassis to said main chassis for relative pivotal movement about a vertical pivot axis;
rear pivot means for connecting said rear sub-chassis to said main chassis for relative pivotal movement about a vertical axis;
a first linkage member mounted on one of said sub-chassis for relative movement with respect thereto along the respective median plane thereof;
a second linkage member mounted on the other of said sub-chassis for relative movement with respect thereto along the respective median plane thereof;
linkage pivot means having a vertical linkage pivot axis for pivotally connecting said first linkage member to said second linkage member for relative pivotal movement about said vertical linkage pivot axis, so that said vertical linkage pivot axis of said linkage pivot means between said first and second linkage members is constrained to lie substantially at the intersection of said front and rear median planes during turning;
said main median plane intersecting the median plane of said one of said sub-chassis on which said first linkage member is mounted at an angle $\beta$ and said main median plane intersecting said median plane of said other of said sub-chassis on which said second linkage member is mounted at an angle $\alpha$, said angle $\beta$ being a function of said angle $\alpha$; and
control means operatively connected to said first linkage member for acting on said first linkage member for controlling the ratio $\alpha/\beta$ of said angles by controlling the motion of said first linkage member during turning.

2. A vehicle as claimed in claim 1 and further comprising:
means for connecting said control means to a part of said first linkage member remote from said vertical linkage pivot axis between said front and rear sub-chassis.

3. A vehicle as claimed in claim 1, wherein:
said control means comprises mechanical control means mounted on said main chassis.

4. A vehicle as claimed in claim 3, wherein:
said control means comprises a rigid link having a first end pivotally connected to said main chassis for relative pivotal movement with respect thereto about a substantially vertical axis, and a second end pivotally connected to said first linkage member for pivotal movement relative thereto about a vertical axis.

5. A vehicle as claimed in claim 4, wherein:
said first end is pivotally connected to said main chassis at a point lying within the length of said first linkage member when said front and rear median planes are co-planar.

6. A vehicle as claimed in claim 3, wherein:
said control means comprises a rigid link having one end pivotally connected to said main chassis for relative pivotal movement with respect thereto about a substantially vertical axis, and a further end indirectly connected to said first linkage member.

7. A vehicle as claimed in claim 1 and further comprising:

a first frame means having a narrow end pivotally connected to said second linkage member for relative pivotal movement about a horizontal axis;

a wider end on said first frame means; and horizontally spaced links on said wider end pivotally connecting said first frame means to said other of said sub-chassis for relative pivotal movement with respect thereto about horizontal axes.

8. A vehicle as claimed in claim 7 and further comprising:

a further frame means having a first end connected to said horizontally spaced links and a second end; and means for pivotally connecting said second end of said further frame means to said other of said sub-chassis for rotation therewith about said vertical pivot axis of said pivot means connecting said main chassis to said other sub-chassis and for pivotal movement about a horizontal axis.

9. A vehicle as claimed in claim 1 and further comprising:

a tubular guide way extending along said median plane of one of said sub-chassis; and at least one of said linkage members being longitudinally slidable in said tubular guide way.

* * * * *